United States Patent
Chatterjee et al.

(10) Patent No.: US 7,024,585 B2
(45) Date of Patent: Apr. 4, 2006

(54) METHOD, APPARATUS, AND PROGRAM FOR DATA MIRRORING WITH STRIPED HOTSPARE

(75) Inventors: Paresh Chatterjee, Fremont, CA (US); Parag Ranjan Maharana, Fremont, CA (US)

(73) Assignee: LSI Logic Corporation, Milpitas, CA (US)

( * ) Notice: Subject to any disclaimer, the term of this patent is extended or adjusted under 35 U.S.C. 154(b) by 461 days.

(21) Appl. No.: 10/166,417

(22) Filed: Jun. 10, 2002

(65) Prior Publication Data

US 2003/0229820 A1 Dec. 11, 2003

(51) Int. Cl.
*G06F 11/00* (2006.01)

(52) U.S. Cl. ......................................... 714/7
(58) Field of Classification Search ...................... 714/6
See application file for complete search history.

(56) References Cited

U.S. PATENT DOCUMENTS

| | | | | |
|---|---|---|---|---|
| 5,579,474 A | * | 11/1996 | Kakuta et al. | 714/6 |
| 5,596,709 A | * | 1/1997 | Bond et al. | 714/7 |
| 5,657,439 A | * | 8/1997 | Jones et al. | 714/7 |
| 5,666,512 A | * | 9/1997 | Nelson et al. | 711/114 |
| 5,754,756 A | * | 5/1998 | Watanabe et al. | 714/6 |
| 6,158,017 A | * | 12/2000 | Han et al. | 714/6 |
| 6,233,696 B1 | * | 5/2001 | Kedem | 714/6 |
| 6,237,109 B1 | * | 5/2001 | Achiwa et al. | 714/6 |
| 6,247,157 B1 | * | 6/2001 | Edirisooriya | 714/767 |
| 6,269,453 B1 | * | 7/2001 | Krantz | 714/6 |
| 6,681,339 B1 | * | 1/2004 | McKean et al. | 714/5 |
| 6,751,136 B1 | * | 6/2004 | Hetrick et al. | 365/200 |
| 2002/0035667 A1 | * | 3/2002 | Bruning et al. | 711/114 |
| 2003/0135514 A1 | * | 7/2003 | Patel et al. | 707/102 |

OTHER PUBLICATIONS

Chen et al "RAID: High-Performance, Reliable Secondary Storage" ACM 1994.*
Menon et al "Comparison of Sparing Alternatives for Disk Arrays" ACM 1992.*
Hou et al. "Comparing Rebuild Algorithms for Mirroed and RAID5 Disk Arrays" ACM 1993.*

* cited by examiner

*Primary Examiner*—Bryce Bonzo
(74) *Attorney, Agent, or Firm*—Yee & Associates

(57) ABSTRACT

A storage controller is provided that allows data mirroring with hotspare where all drives take part in data storage. For each stripe written, a drive is designated as the hotspare. The hotspare is not a dedicated drive. Rather, the hotspare rotates as stripes are written to the drives. Thus, every drive is involved in data storage and load may be balanced among more drives. Furthermore, since each drive takes part in data storage, reconstruction after a drive failure takes less time.

17 Claims, 4 Drawing Sheets

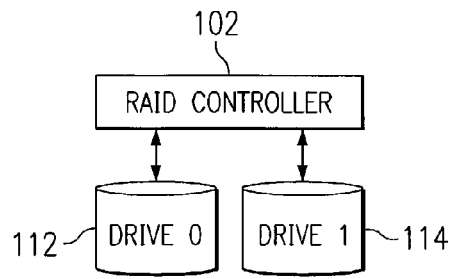
FIG. 1A
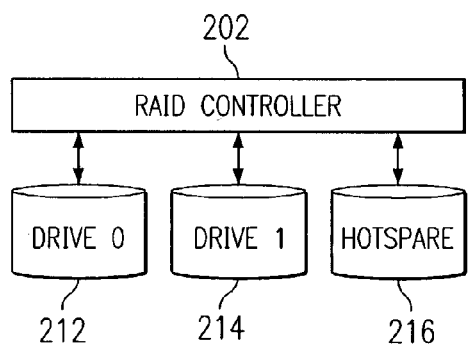
FIG. 2A
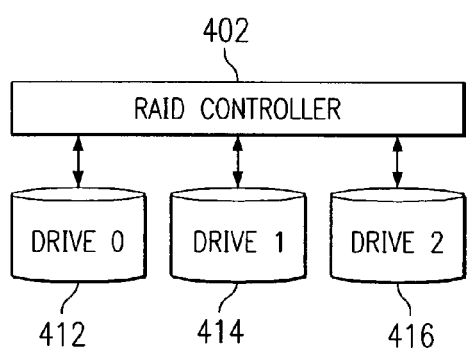
FIG. 4A
N-STRIPE N; N'-MIRROR
DATA OF STRIPE N
| DRIVE 0 | DRIVE 1 |
|---------|---------|
| 0       | 0'      |
| 1       | 1'      |
| 2       | 2'      |
| 3       | 3'      |
| 4       | 4'      |
| 5       | 5'      |
FIG. 1B
N-STRIPE N; N'-MIRROR DATA OF
STRIPE N; ⊖-UNUSED SPACE
| DRIVE 0 | DRIVE 1 | HOTSPARE |
|---------|---------|----------|
| 0       | 0'      | ⊖        |
| 1       | 1'      | ⊖        |
| 2       | 2'      | ⊖        |
| 3       | 3'      | ⊖        |
| 4       | 4'      | ⊖        |
| 5       | 5'      | ⊖        |
FIG. 2B
N-STRIPE N; N'-MIRROR DATA OF
STRIPE N; ⊖-UNUSED SPACE
| DRIVE 0 | DRIVE 1 | DRIVE 2 |
|---------|---------|---------|
| 0       | 0'      | ⊖       |
| 1       | ⊖       | 1'      |
| ⊖       | 2       | 2'      |
| 3       | 3'      | ⊖       |
| 4       | ⊖       | 4'      |
| ⊖       | 5       | 5'      |
FIG. 4B

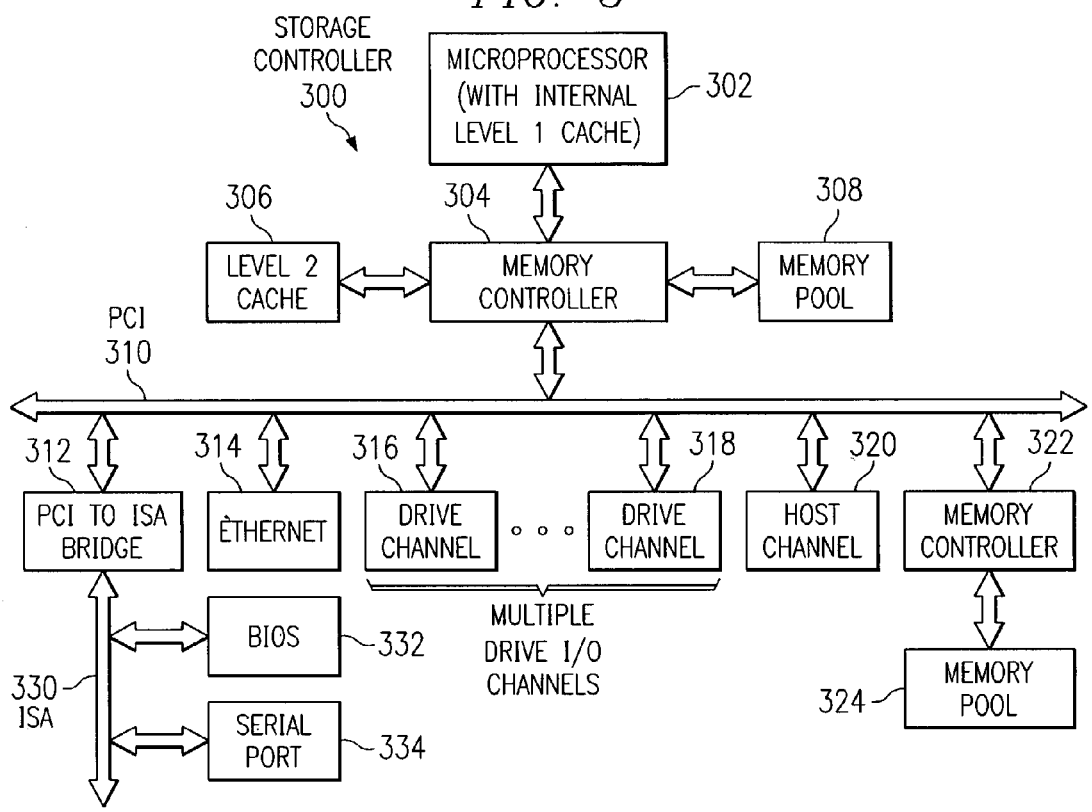
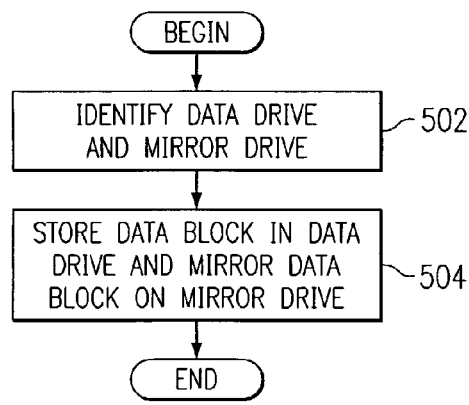

METHOD, APPARATUS, AND PROGRAM FOR DATA MIRRORING WITH STRIPED HOTSPARE

BACKGROUND OF THE INVENTION

1. Technical Field

The present invention relates to data storage and, in particular, to redundant arrays of independent disks. Still more particularly, the present invention provides a method, apparatus, and program for data mirroring with striped hotspare.

2. Description of the Related Art

Redundant array of independent disks (RAID) is a disk subsystem that is used to increase performance and provide fault tolerance. RAID is a set of two or more ordinary storage devices and a specialized disk controller that contains the RAID functionality. RAID can also be implemented via software only. RAID can improve performance by disk striping, which interleaves bytes or groups of bytes across multiple drives, so more than one disk is reading and writing simultaneously. Striping is referred to as RAID 0.

Fault tolerance is achieved by mirroring or parity. Mirroring is 100% duplication of the data on two storage devices. Mirroring is referred to as RAID 1. With reference to FIG. 1A, an example RAID 1 configuration is shown. RAID controller 102 receives data and manages the storage of the data onto storage devices, for example disk drives 112, 114. FIG. 1B is a table that shows the storage of data blocks, or stripes, on the drives. The RAID controller may store the data, for example, on drive 0 and mirror or copy each stripe onto a drive 1, as shown in FIG. 1B. If one of the drives fails, the other drive can be used to maintain data integrity.

A failed drive can be hot swapped with a new one, and the RAID controller automatically rebuilds the lost data. A hotspare is a spare disk drive in a RAID configuration that is put into action when another drive fails. Using the RAID algorithms, the missing data from the faulty drive is reconstructed and written to the hot spare. When the bad drive is replaced, it then may become the hotspare. With reference now to FIG. 2A, an example RAID 1 configuration with hotspare is shown. RAID controller 202 receives data and manages the storage of the data onto storage devices, for example disk drives 212, 214. Hotspare drive 216 is provided as a dedicated drive that may be put into action if drive 0 or drive 1 fails. FIG. 2B is a table that shows the storage of the data on the drives. The RAID controller may store the data, for example, on drive 0 and mirror or copy each stripe onto drive 1, as shown in FIG. 2B. If one of the drives fails, the remaining drive can be used to maintain data integrity and the data from the remaining drive can be reconstructed onto the hotspare drive to retain fault tolerance.

However, since the hotspare drive is unused unless a drive fails, the use of a dedicated hotspare drive results in a waste of bandwidth. Access requests, particularly read requests, must be balanced between two drives, while the dedicated hotspare drive sits idle. Furthermore, if a drive fails, all of the data stored on the drives must be reconstructed onto the hotspare drive. As the amount of data increases, the time required to activate the hotspare drive increases.

Therefore, it would be advantageous to provide an improved mechanism for providing data mirroring with hotspare.

SUMMARY OF THE INVENTION

The present invention provides a storage controller that allows data mirroring with hotspare where all drives take part in data storage. For each stripe written, a drive is designated as the hotspare. The hotspare is not a dedicated drive. Rather, the hotspare rotates as stripes are written to the drives. Thus, every drive is involved in data storage and load may be balanced among more drives. Furthermore, since each drive takes part in data storage, reconstruction after a drive failure will take less time.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 1A and 1B illustrate an example RAID 1 configuration and data storage therein;

FIGS. 2A and 2B illustrate an example RAID 1 configuration with a dedicated hotspare and data storage therein;

FIG. 3, a block diagram is shown illustrating an example storage controller architecture in accordance with a preferred embodiment of the present invention;

FIGS. 4A and 4B illustrate an example RAID 1 configuration with striped hotspare and data storage therein according to a preferred embodiment of the present invention;

FIG. 5 is a flowchart illustrating the operation of a storage controller writing a data stripe using mirroring with striped hotspare in accordance with a preferred embodiment of the present invention;

DETAILED DESCRIPTION

Figure 6:
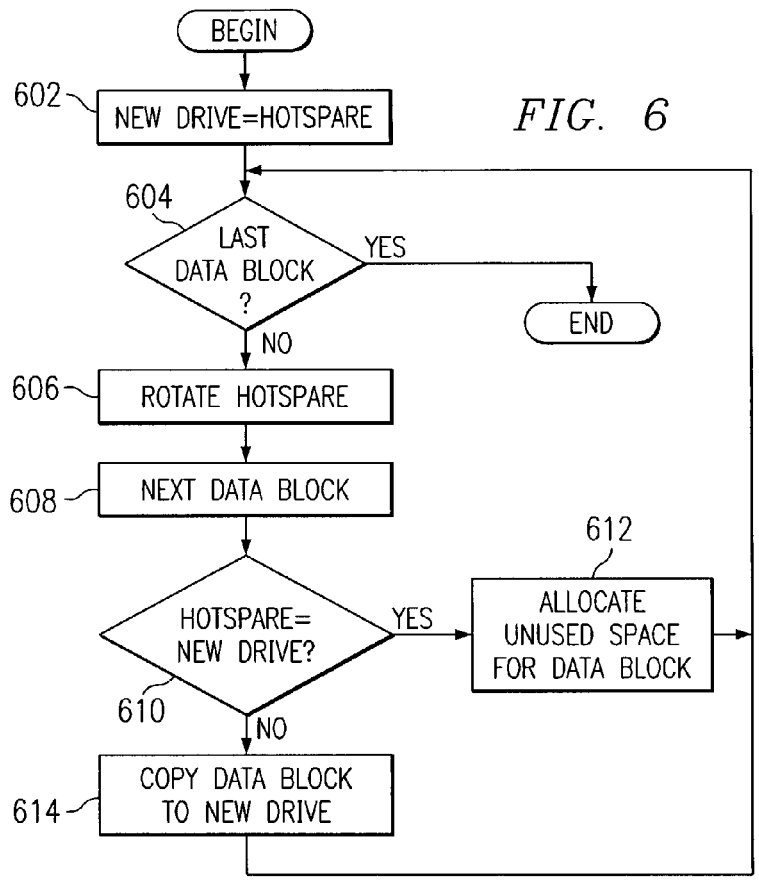
FIG. 6 is a flowchart illustrating the operation of a storage controller adding a hotspare drive to a mirrored configuration in accordance with a preferred embodiment of the present invention.

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

With reference now to the figures and in particular with reference to FIG. 3, a block diagram is shown illustrating an example storage controller architecture in accordance with a preferred embodiment of the present invention. Storage controller 300 employs a peripheral component interconnect (PCI) local bus architecture. Although the depicted example employs a PCI bus, other bus architectures such as Industry Standard Architecture (ISA) may be used. Microprocessor 302, with internal level 1 cache, and memory pool 308 are connected to PCI local bus 310 through memory controller 304. Microprocessor level 2 cache 306 is also connected to memory controller 304. PCI bridge 310 also may include an integrated memory controller and cache memory for processor 302.

In the depicted example, Ethernet adapter 314, PCI to ISA bridge 312, drive channel adapters 316–318, and host channel adapter 320 are connected to PCI bus 310 by direct component connection. PCI to ISA Bridge 312 provides a connection through ISA bus 330 for basic input output system (BIOS) 332 and serial port 334.

Processor 302 is used to coordinate and provide control of various components within storage controller 300 in FIG. 3A. Instructions for the storage controller may be located on storage devices, such as BIOS 322, and may be loaded into memory pool 308 for execution by processor 302. Memory pool 308 may be a single memory pool that is logically partitioned into two regions. A first region serves as processor memory. This portion of memory is used by processor 302, for example, as "scratch pad" memory to perform the operations of the storage controller. The second region of memory pool 308 may serve as I/O buffer memory or level 1 storage controller cache. Also, memory pool 324 may be connected to PCI bus 310 by memory controller 322. Memory pool 324 may also serve as I/O buffer memory or level 1 storage controller cache.

Drive channel adapters 316–318 provide drive channels for storage devices, such as hard disk drives. A storage controller may have, for example, four drive channels. Each drive channel may support multiple drives per channel. The number of drives is limited by I/O hardware and communication protocol.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention. The storage controller depicted in FIG. 3 may be, for example, a redundant array of independent disks (RAID) controller.

With reference to FIG. 4A, an example RAID 1 configuration with striped hotspare is shown in accordance with a preferred embodiment of the present invention. RAID controller 402 receives data and manages the storage of the data onto storage devices, for example disk drives 412–416. Hotspare is provided as unused drive space that may be put into action if a drive fails. The hotspare is not a dedicated drive. Rather, the hotspare rotates as stripes are written to the drives. This is referred to herein as "striped hotspare."

FIG. 4B is a table that shows the storage of the data on the drives. The RAID controller may store the data, for example, on drive 0 and mirror or copy a stripe onto drive 1 with the hotspare being drive 2, as shown in FIG. 4B. Next, the RAID controller may store a stripe or data block on drive 0 and mirror the data block onto drive 2 with the hotspare being drive 1. Then, the RAID controller may store a stripe on drive 1 and mirror the stripe onto drive 2 with the hotspare being drive 0.

If one of the drives fails, the remaining drives can be used to maintain data integrity, as at least one copy of each stripe or data block will be stored on the remaining drives. The data from the remaining drives may be reconstructed and mirrored to form a RAID 1 configuration. Thus, fault tolerance is retained in the event of a drive failure and performance is increased if a drive does not fail.

The example shown in FIGS. 4A and 4B includes three drives. However, more drives may be used depending on the implementation. For example, the present invention may be implemented with mirroring and data striping. In this instance, data may be striped across two or more drives and mirrored onto another set of two drives. An additional drive may be provided to enable striped hotspare. More specifically, this example may include five drives: two drives to store data stripes, two drives to mirror the data stripes, and a hotspare drive that is unused. In accordance with the present invention, the hotspare drive would rotate among the five drives to make use of the bandwidth. As another example, the configuration shown in FIGS. 4A and 4B may use two hotspare drives. Thus, for each write, one drive will be designated as the data drive, one drive will be designated as the mirror drive, and two hotspare drives will be unused for the data block. In this example, load may be balanced across four drives and the additional drive provides an extra level of fault tolerance. For simplicity, the case with three drives is discussed in detail.

With reference to FIG. 5, a flowchart is shown illustrating the operation of a storage controller writing a data stripe using mirroring with striped hotspare in accordance with a preferred embodiment of the present invention. The process begins and identifies a data drive and a mirror drive for the write (step 502). The data drive and the mirror drive are determined based on a rotating hotspare designation according to the present invention. The process then stores the data block in the data drive and mirrors the data block on the identified mirror drive (step 504). The writes to the data drive and mirror drive may be performed simultaneously. Thereafter the process ends.

With reference now to FIG. 6, a flowchart illustrating the operation of a storage controller adding a hotspare drive to a mirrored configuration is shown in accordance with a preferred embodiment of the present invention. The process begins and the new drive is set to be the hotspare (step 602). Next, a determination is made as to whether the current data block is the last data block (step 604). If the current data block is the last data block, then the process ends.

If the current data block is not the last data block, the process rotates the hotspare (step 606) and processes the next data block (step 608). Then, a determination is made as to whether the hotspare is the new drive (step 610). If the hotspare is the new drive, the process allocates unused space for the data block on the new drive (step 612) and returns to step 604 to determine whether the current data block is the last data block. If the hotspare is not the new drive in step 610, the process copies the data block from the hotspare drive to the new drive (step 612) and returns to step 604 to determine whether the current data block is the last data block.

The process shown in FIG. 6 may be used to add a hotspare ready drive to an existing RAID 1 configuration. For data blocks for which the new drive is not the hotspare, the data block can be copied from one of the existing drives. Alternatively, the process of FIG. 6 may be used to restore a drive configuration to optimal RAID 1 with striped hotspare after a drive failure. If a drive fails in RAID 1 with striped hotspare, the missing data may be recovered from the remaining drives because at least one drive will have a copy of each data block.

Figure 7:
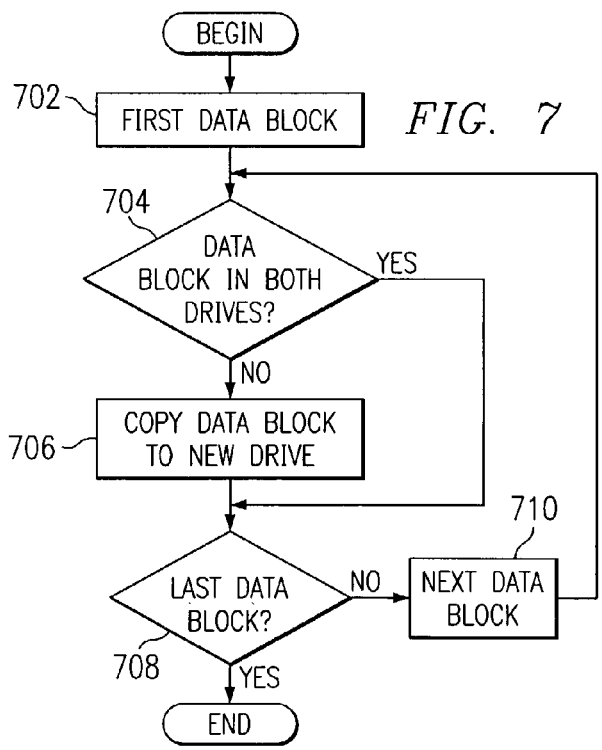
FIG. 7 is a flowchart depicting the operation of a storage controller restoring to a mirrored with striped hotspare configuration after a drive fails in accordance with a preferred embodiment of the present invention.

Turning to FIG. 7, a flowchart is shown depicting the operation of a storage controller restoring to a mirrored with striped hotspare configuration after a drive fails in accordance with a preferred embodiment of the present invention. After a drive failure in a mirrored configuration with striped hotspare, the two remaining drives will form a partially mirrored configuration. In response to a new hotspare drive being added, the storage controller may then restore the drives to an optimal mirrored with striped hotspare configuration.

The process begins and examines the first data block (step 702). A determination is made as to whether the data block is stored in both of the remaining drives after the failure drives (step 704). If the data block is not stored in both drives, then the failed drive was not the hotspare for the current block and the process copies the data block to the new drive (step 706). If the data block is stored in both drives in step 704, then the failed drive was the hotspare and no copy is necessary. Next, a determination is made as to whether the block is the last data block (step 708). If the block is the last data block, the process ends; otherwise, the process examines the next data block (step 710) and returns to step 704 to determine whether the next data block is stored in both drives.

Figure 8:
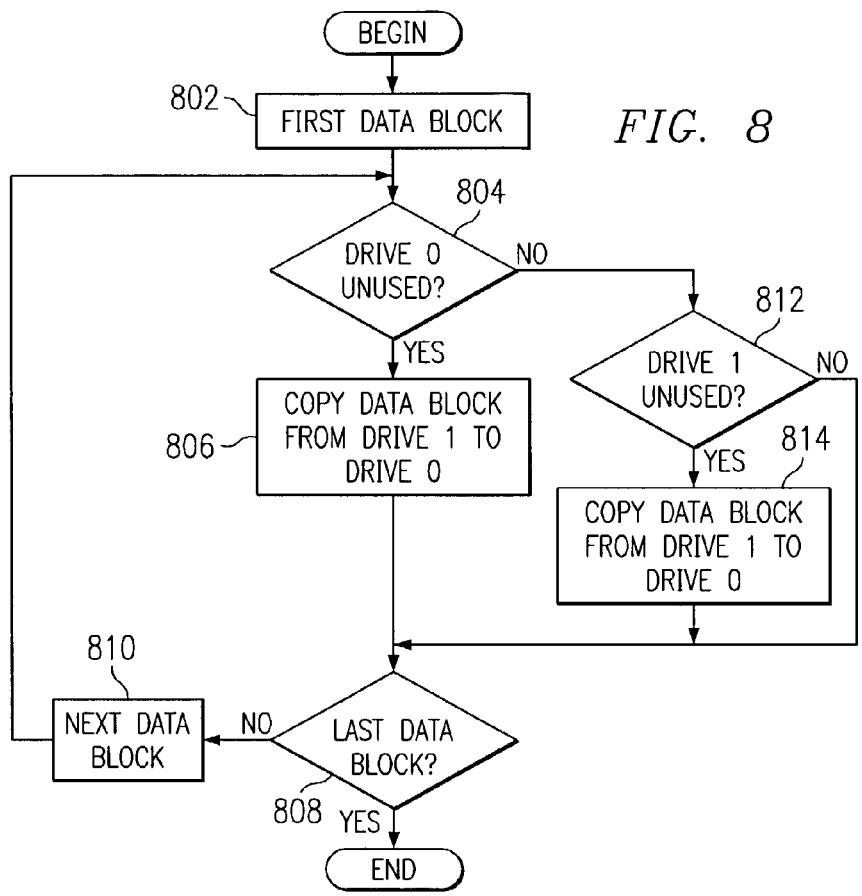
FIG. 8 is a flowchart depicting the operation of a storage controller restoring to a mirrored configuration after a drive fails in accordance with a preferred embodiment of the present invention.

With reference now to FIG. 8, a flowchart is shown depicting the operation of a storage controller restoring to a mirrored configuration after a drive fails in accordance with a preferred embodiment of the present invention. After a drive failure in a mirrored configuration with striped hotspare, the two remaining drives will form a partially mirrored configuration. The storage controller may then restore the remaining drives to a fully mirrored configuration. For simplicity, the two remaining drives are referred to as drive 0 and drive 1. The process begins and examines the first data block (step 802). A determination is made as to whether drive 0 is unused for the data block (step 804). If drive 0 is unused, then drive 0 was the hotspare for the current block and the process copies the data block from drive 1 to drive 0 (step 806).

Next, a determination is made as to whether the block is the last data block (step 808). If the block is the last data block, the process ends; otherwise, the process examines the next data block (step 810) and returns to step 804 to determine whether drive 0 is unused. If drive 0 is not unused in step 804, a determination is made as to whether drive 1 is unused for the data block (step 812). If drive 1 is unused, then drive 1 was the hotspare for the current block and the process copies the data block from drive 0 to drive 1 (step 814) and proceeds to step 808 to determine whether the block is the last data block. If drive 1 is not unused in step 812, then the failed drive was the hotspare for the block and the process proceeds directly to step 808 to determine whether the block is the last data block.

Figure 9:
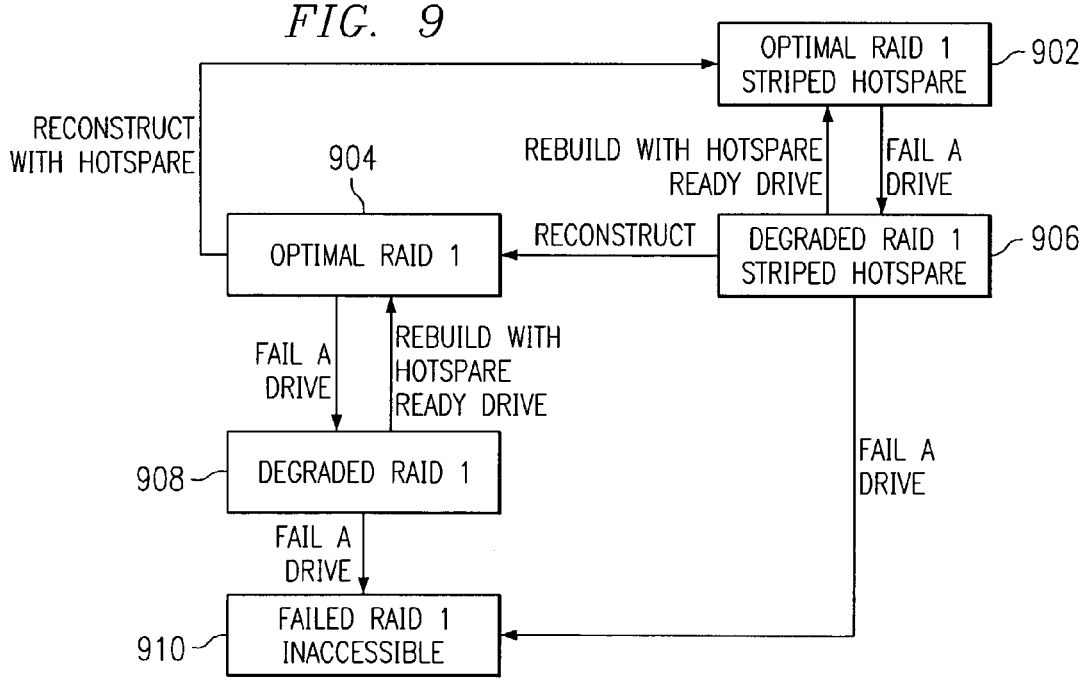
FIG. 9 is a block diagram illustrating the levels of RAID in accordance with a preferred embodiment of the present invention.

With reference to FIG. 9, a block diagram is shown illustrating the levels of RAID in accordance with a preferred embodiment of the present invention. Optimal RAID 1 with striped hotspare 902 exists when all drives are functioning to store data and the hotspare is striped across the drives. Optimal RAID 1 904 exists when two or more drives are functioning to store data with mirroring. Optimal RAID 1 may be reconstructed with a hotspare drive to form optimal RAID 1 with striped hotspare 902. This may be accomplished using a process similar to that shown in FIG. 6.

If a drive fails in optimal RAID 1 with striped hotspare, the configuration becomes degraded RAID 1 with striped hotspare 906, meaning all the data exists on the remaining drives with partial mirroring and partial striped hotspare. The configuration can be rebuilt with a hotspare ready drive to return to optimal RAID 1 with striped hotspare 902. This may be accomplished using a process similar to that shown in FIG. 7. Alternatively, the remaining drives may be reconstructed to form optimal RAID 1 904. This may be accomplished using a process similar to that shown in FIG. 8.

If a drive fails in optimal RAID 1, the configuration becomes degraded RAID 1 908, meaning all the data exists on one drive with no fault tolerance. This configuration may be rebuilt with a hotspare ready drive to return to optimal RAID 1 904, as known in the art. If a drive subsequently fails in degraded RAID 1, the configuration becomes failed RAID 1 910 and all data becomes inaccessible. Similarly, if a drive fails in degraded RAID 1 with striped hotspare 906, the configuration becomes failed RAID 1 910 and much of the data becomes inaccessible.

Thus, the present invention solves the disadvantages of the prior art by providing a storage controller that performs data mirroring and uses a hotspare, but stripes the hotspare across the active drives. Each drive takes part in data storage; therefore, load may be balanced among more drives and reconstruction after a drive failure takes less time. Furthermore, if a drive fails in optimal RAID 1 with striped hotspare, the configuration may be rebuilt back to optimal RAID 1 with striped hotspare or may be reconstructed to RAID 1.

It is important to note that while the present invention has been described in the context of a fully functioning storage system, those of ordinary skill in the art will appreciate that the processes of the present invention are capable of being distributed in a form of a computer readable medium of instructions and in a variety of forms. Further, the present invention applies equally regardless of the particular type of signal bearing media actually used to carry out the distribution. Examples of computer readable media include recordable-type media such a floppy disc, a hard disk drive, a RAM, a CD-ROM, a DVD-ROM, and transmission-type media such as digital and analog communications links, wired or wireless communications links using transmission forms such as, for example, radio frequency and light wave transmissions. The computer readable media may take the form coded formats that are decoded for actual use in a particular data processing system.

What is claimed is:

1. A method for storing data in a plurality of storage devices, comprising:
    receiving a plurality of data blocks to be written; and
    writing each of the plurality of data blocks, wherein writing a given data block within the plurality of data blocks comprises:
        designating a data drive, at least one mirror drive, and a hotspare drive from the plurality of storage devices for the given data block;
        storing the data block in the data drive; and
        mirroring the data block on the at least one mirror drive,
        providing hotspare space on the hotspare drive for the given data block, wherein the hotspare space is unused drive space that may be put into action if a drive fails,
    wherein each storage device in the plurality of storage devices is designated as a hotspare drive for at least one data block, and
    wherein all storage devices in the plurality of storage devices store at least one of the plurality of data blocks.

2. The method of claim 1, wherein the designation of the hotspare drive rotates within the plurality of storage devices for the plurality of data blocks to be written.

3. The method of claim 1, wherein, upon failure of a storage device in the plurality of storage devices, all of the plurality of data blocks can be read from remaining storage devices in the plurality of storage devices.

4. The method of claim 3, further comprising:
in response to a failed storage device, reconstructing the remaining storage devices to form a mirrored configuration.

5. The method of claim 4, further comprising:
replacing the failed storage device; and
reconstructing the plurality of storage devices to form a configuration in which all storage devices in the plurality of storage devices store at least one of the plurality of data blocks and each storage device in the plurality of storage devices is a hotspare for at least one data block.

6. The method of claim 3, further comprising:
replacing a failed storage device within the plurality of storage devices with a replaced storage device; and
reconstructing the plurality of storage devices by determining if a current data block to be restored is stored on more than one of the plurality of storage devices that did not fail and (i) if not, copy the current data block to the replaced storage device, (ii) if so, proceed to a next data block as the failed storage drive was a hotspare for the current data block and therefore no restore of the current data block is needed.

7. The method of claim 1, wherein the plurality of storage devices form a volume.

8. The method of claim 1, wherein the method is performed by a storage controller.

9. A method of adding a striped hotspare to a mirrored configuration comprising a first plurality of storage devices, wherein each storage device in the first plurality of storage devices stores a copy of each data block stored in a first plurality of storage devices, the method comprising:
adding a hotspare drive to the first plurality of storage devices to form a second plurality of storage devices;
rebuilding the second plurality of storage devices to form a configuration in which all storage devices in the second plurality of storage devices store at least one of the plurality of data blocks and each storage device in the plurality of storage devices is a hotspare for at least one data block.

10. An apparatus for storing data in a plurality of storage devices, comprising:
a processor; and
a plurality of storage devices, coupled to the processor, wherein the processor is configured to receive a plurality of data blocks to be written;
wherein, for each data block in the plurality of data blocks to be written, the processor is configured to write each of the plurality of data blocks, wherein writing a given data block within the plurality of data blocks comprises designating a data drive, at least one mirror drive, and a hotspare drive from the plurality of storage devices for the given data block, storing the data block in the data drive, mirroring the data block on the at least one mirror drive, providing hotspare space on the hotspare drive for the given data block, wherein the hotspare space is unused drive space that may be put into action if a drive fails,
wherein each storage device in the plurality of storage devices is designated as a hotspare drive for at least one data block, and
wherein all storage devices in the plurality of storage devices store at least one of the plurality of data blocks.

11. The apparatus of claim 10, wherein the designation of the hotspare drive rotates within the plurality of storage devices for the plurality of data blocks to be written.

12. The apparatus of claim 10, wherein, upon failure of a storage device in the plurality of storage devices, all of the plurality of data blocks can be read from remaining storage devices in the plurality of storage devices.

13. The apparatus of claim 10, wherein the plurality of storage devices form a volume.

14. The apparatus of claim 10, wherein the processor is embodied in a storage controller.

15. A storage module comprising:
a storage controller including a processor; and
a plurality of storage devices coupled to the storage controller,
wherein the storage controller has a plurality of modes of operation including:
a first mode of operation in which the storage controller receives a plurality of data blocks to be written; and
a second mode of operation in which the storage controller writes each of the plurality of data blocks, wherein writing a given data block within the plurality of data block comprises designating a data drive, at least one mirror drive, and a hotspare drive from the plurality of storage devices for the given data block, storing the data block in the data drive, mirroring the data block on the at least one mirror drive, providing hotspare space on the hotspare drive for the given data block, wherein the hotspare space is unused drive space that may be put into action if a drive fails,
wherein each storage device in the plurality of storage devices is designated as a hotspare drive for at least one data block, and
wherein all storage devices in the plurality of storage devices store at least one of the plurality of data blocks.

16. The storage module of claim 15, wherein the designation of the hotspare rotates within the plurality of storage devices for the plurality of data blocks to be written.

17. A computer program product in a computer readable medium, comprising computer readable program code means for enabling a data processing machine to store data in a plurality of storage devices, comprising:
instructions for receiving a plurality of data blocks to be written;
instructions for writing each of the plurality data blocks, wherein the instructions for writing a given data block within the plurality data blocks comprises:
instructions for designating a data drive, at least one mirror drive, and a hotspare drive from the plurality of storage devices for the given data block;
instructions for storing the data block in the data drive; and
instructions for mirroring the data block on the at least one mirror drive,
instructions for providing hotspare space on the hotspare drive for the given data block, wherein the hotspare space is unused drive space that may be put into action if a drive fails,
wherein each storage device in the plurality of storage devices is designated as a hotspare drive for at least one data block, and
wherein all storage devices in the plurality of storage devices store at least one of the plurality of data blocks.

* * * * *